A. P. SMITH.
MITTEN.
No. 6764 Reissued Nov. 23, 1875
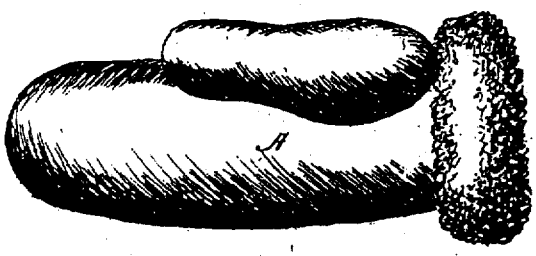
Fig. 1.
Fig. 2.
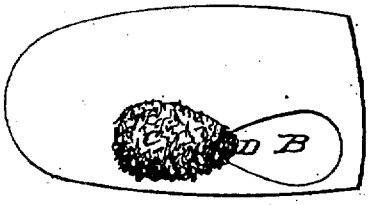
Fig. 3.
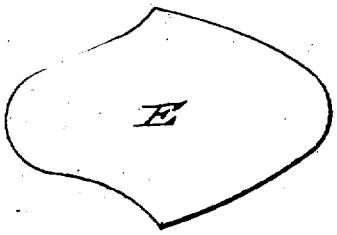
Fig. 4.
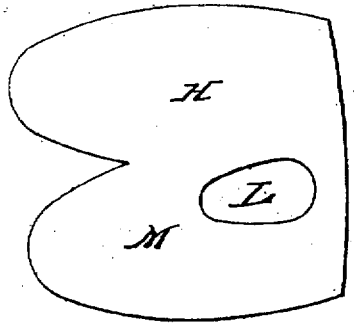
Fig. 5.
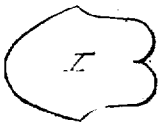
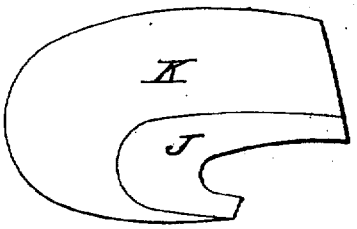
Fig.
Witnesses:
Inventor:
A. P. Smith
THE NORRIS PETERS CO., PHOTO-LITHO., WASHINGTON, D. C.

UNITED STATES PATENT OFFICE.

AUGUSTUS P. SMITH, OF STERLING, ILLINOIS.

IMPROVEMENT IN MITTENS.

Specification forming part of Letters Patent No. 60,949, dated January 1, 1867; reissue No. 6,764, dated November 23, 1875; application filed July 6, 1875.

*To all whom it may concern:*

Be it known that I, A. P. SMITH, of Sterling, in the county of Whitesides and State of Illinois, have invented a new and useful Improvement in the Manufacture of Sheep-Skin and other Leather Mittens; and I do hereby declare the following to be a full, clear, and exact description thereof, which will enable others skilled in the art to which it appertains to make and use the same, reference being had to the accompanying drawing, forming part of this specification, in which—

Figure 1 is a front view of a mitten embodying my said invention. Fig. 2 is a plan view of the blank forming the palm of the mitten, showing the manner of cutting the thumb-space. Fig. 3 is a plan of the back. Fig. 4 is a plan of the facing. Fig. 5 is a plan view of the blank forming the back of the thumb; and Fig. 6 is a cross-section of the mitten, taken on the line *x x*, drawn across Fig. 1, showing the manner of securing the facing to the palm.

Similar letters of reference indicate like parts in the several figures of the drawing.

The object of my invention is to so unite the facing to the palm of the mitten as to prevent exposure of the stitches connecting the same, and to obviate the necessity of forming a seam around the entire portion of the thumb at its junction with the body of the mitten. To that end it consists, first, in cutting the material forming the palm and back of the mitten, and the facing for the palm, in separate sections, and then sewing up the palm with the facing and back as the latter are stitched together; secondly, in cutting the thumb-space so that the portion partially removed from said space shall form the whole of the inside or palm of the thumb, without being cut so as to detach it from the body portion of the mitten, whereby the seam is only extended in part around the back of the thumb, and no seam is exposed to wear on the inside of the thumb.

In the present case I have shown the mitten to be made of sheep-skin tanned with the wool on, and the palm of the hand faced with calf-skin; but I do not confine myself exclusively to this class of material, as it is obvious that other material may be used.

In the drawing, A represents the blank or section forming the palm or inside of the mitten, and A′ the back, both of which are cut of one general shape, as shown in Figs. 2 and 3, and of the proper size and dimensions to fit the hand on which it is to be worn, when the sections are stitched together. B is the facing, which is cut of the same general size and shape as that of section A. The parts or sections A B are each provided with an opening, C, cut through the same, forming the thumb-space. This opening is cut in the form shown, and only a portion of the way around, leaving the part D, taken from said opening, attached to the part from which it was cut at the junction of the thumb with the body of the mitten, and of sufficient length to enable the part D to form the whole of the inside of the thumb. E represents the section forming the back of the thumb, which is made of the same material used in forming the body portion of the mitten, and is cut in proper shape to fit around the opening C and against the edges of part D.

In attaching the several parts together to complete the mitten, the sections A A′ are laid one upon the other, with the facing B between them. The whole are then firmly stitched together in a suitable manner, and the part E stitched to the edges of the part D, and around the edges of the remaining portion of the opening or thumb-space C. The mitten is then turned right side out, when it is complete and ready to be worn.

In order that my present invention may be more clearly understood, I will briefly describe the ordinary mode of manufacturing mittens, the several parts comprising the same being shown, respectively, in Figs. 7, 8, and 9, and lettered H, I, J, and K.

H is the hand portion, cut in one piece, to form both the palm and back of the mitten, with an opening, L, forming the thumb-space cut through the front or palm portion M, in the proper place to admit the thumb. I represents the portion forming the thumb, and J K, respectively, the facing for the thumb and the front or palm of the hand.

In attaching the several parts together, the thumb and hand-facing J K are at first stitched together around the thumb-space L′ of the hand-facing. The part I is then stitched together, forming the covering for the thumb, when the same is sewed to the edges of the thumb-space L of the mitten proper, the seam extending around the entire periphery of the opening. The back and palm are then folded on the line *e e* and stitched together, and the facing hemmed to the palm of the hand and thumb, completing the mitten.

With this last-described construction, it will be seen that the stitches connecting the facing to the body of the mitten are exposed, and that the seam at the junction of the thumb with the hand portion of the mitten extends entirely around the thumb, which is not the case with my invention, and the consequent advantages of which are several. First, the stitches are not subjected to exposure—consequently are less liable to be worn, and the seams remain intact much longer than when exposed. Secondly, by so cutting the thumb-space as to not detach the part taken therefrom at the junction of the thumb with the body of the mitten, it obviates the necessity of extending the seam entirely around the thumb, and by making the part long enough to reach to the end of the thumb, no seam whatever will be exposed on the inside of the thumb, where the wear is greatest, consequently making a more durable and perfectly-fitting mitten.

Having thus described my invention, I claim—

1. A mitten, the back, palm, and facing of the hand being formed in three parts, and stitched together by a single seam, to prevent exposure of the stitches, as specified.

2. A mitten having the inside of the thumb wholly formed from the material taken from the thumb-space, without being detached in the cutting at its junction with the hand portion of the mitten, whereby no seam is exposed to strain or wear on the inside of the thumb, as specified.

3. A mitten having the thumb formed, in part, of the material taken from the thumb-space, without being wholly detached in the cutting, all the parts being united with each other and with the facing by a single seam, substantially as described.

AUGUSTUS P. SMITH.

Witnesses:

A. M. PHELPS,

HENRY P. PRICE.